US011176950B2

(12) United States Patent
Jung et al.

(10) Patent No.: US 11,176,950 B2
(45) Date of Patent: Nov. 16, 2021

(54) APPARATUS FOR RECOGNIZING VOICE SPEAKER AND METHOD FOR THE SAME

(71) Applicants: Hyundai Mobis Co., Ltd., Seoul (KR); Hanyang University Industry-Academic Cooperation Foundation, Seoul (KR)

(72) Inventors: Yu Jin Jung, Uiwang-si (KR); Ki Hee Park, Seoul (KR); Chang Won Lee, Uiwang-si (KR); Doh Hyun Kim, Seongnam-si (KR); Tae Kyung Kim, Uiwang-si (KR); Tae Yoon Son, Yongin-si (KR); Joon Hyuk Chang, Seoul (KR); Joon Young Yang, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 302 days.

(21) Appl. No.: 16/359,077

(22) Filed: Mar. 20, 2019

(65) Prior Publication Data
US 2019/0295553 A1    Sep. 26, 2019

(30) Foreign Application Priority Data

Mar. 21, 2018 (KR) .......................... 10-2018-0032533

(51) Int. Cl.
*G10L 17/18* (2013.01)
*G10L 17/20* (2013.01)
*G06N 20/00* (2019.01)
*G06N 3/08* (2006.01)

(52) U.S. Cl.
CPC ............... *G10L 17/18* (2013.01); *G06N 3/08* (2013.01); *G06N 20/00* (2019.01); *G10L 17/20* (2013.01)

(58) Field of Classification Search
CPC ......... G10L 17/18; G10L 17/20; G10L 17/02; G10L 17/04; G10L 17/12; G06N 20/00; G06N 3/08; G06N 3/0454; G06N 3/0472
See application file for complete search history.

(56) References Cited

U.S. PATENT DOCUMENTS

| 2008/0249774 | A1* | 10/2008 | Kim ........................ G10L 17/02 |
| | | | 704/250 |
| 2018/0293988 | A1* | 10/2018 | Huang .................... G10L 17/20 |
| 2018/0366127 | A1* | 12/2018 | Sreepathihalli ......... G10L 25/24 |
| 2019/0043512 | A1* | 2/2019 | Huang .................... G10L 17/26 |
| 2019/0164557 | A1* | 5/2019 | Borkar .................... G10L 17/04 |

FOREIGN PATENT DOCUMENTS

KR    10-2008-0090034    10/2008

* cited by examiner

*Primary Examiner* — Angela A Armstrong
(74) *Attorney, Agent, or Firm* — H.C. Park & Associates, PLC

(57) ABSTRACT

Disclosed herein are an apparatus and method for recognizing a voice speaker. The apparatus for recognizing a voice speaker includes a voice feature extraction unit configured to extract a feature vector from a voice signal inputted through a microphone; and a speaker recognition unit configured to calculate a speaker recognition score by selecting a reverberant environment from multiple reverberant environment learning data sets based on the feature vector extracted by the voice feature extraction unit and to recognize a speaker by assigning a weight depending on the selected reverberant environment to the speaker recognition score.

13 Claims, 3 Drawing Sheets

APPARATUS FOR RECOGNIZING VOICE SPEAKER AND METHOD FOR THE SAME

CROSS-REFERENCES TO RELATED APPLICATION

This application claims priority from and the benefit of Korean Patent Application No. 10-2018-0032533, filed on Mar. 21, 2018, which is hereby incorporated by reference for all purposes as if set forth herein.

BACKGROUND

Field

Exemplary embodiments relate to an apparatus and method for recognizing a voice speaker, and more particularly, to an apparatus and method for recognizing a voice speaker, which may improve speaker recognition accuracy in a highly reverberant space.

Discussion of the Background

These days, with the development of electronic devices, a huge part of vehicle performance improvement depends on the control of electronic devices. Particularly, various types of sensors, which are used in order to improve the performance of an engine, enables the engine to be run with optimized efficiency, whereby the reliability of a vehicle also is improved. Also, the development of electronic devices is being applied not only to the practical operation of engines but also to safety devices for the safety of a driver, various additional devices for driving convenience, driving devices, and the like.

One of new and interesting features of such additional devices is to enable the control of a vehicle by talking to the vehicle through voice synthesis and voice recognition.

A voice recognition device enables a driver to control an additional device without turning the eyes thereto while the driver is driving a vehicle using hands and feet.

However, because a vehicle can be used by many unspecified people, a voice recognition device is designed to recognize the voice of many unspecified people and to perform their voice commands.

However, when a voice command is performed by recognizing the voice of many unspecified people, because people other than a driver, that is, passengers, are also recognized as speakers, a vehicle may be controlled in response to their voice, which may cause an accident.

Particularly, because the effect of reverberation is large in a small space, such as the interior space of a vehicle, the performance of voice recognition may vary depending on the space.

Accordingly, a speaker recognition model that may maintain the same level of speaker recognition accuracy in various reverberant environments is required.

The related art of the present invention is disclosed in Korean Patent Application and Publication No. 10-2008-0090034 published on Oct. 8, 2008 and entitled "Voice speaker recognition method and system".

The above information disclosed in this Background section is only for enhancement of understanding of the background of the invention and, therefore, it may contain information that does not constitute prior art.

SUMMARY

Exemplary embodiments of the present invention are directed to an apparatus for recognizing a voice speaker and a method for the same, which may improve speaker recognition performance in a wide variety of reverberant environments by recognizing a speaker in such a way that a speaker recognition score is calculated by extracting a model that is closest to a specific reverberant environment from a plurality of reverberant environments used to configure learning data sets and a weight based on each environment is assigned to the speaker recognition score.

In one embodiment, an apparatus for recognizing a voice speaker may include: a voice feature extraction unit configured to extract a feature vector from a voice signal inputted through a microphone; and a speaker recognition unit configured to calculate a speaker recognition score by selecting a reverberant environment from multiple reverberant environment learning data sets based on the feature vector, which is extracted by the voice feature extraction unit, and to recognize a speaker by assigning a weight depending on the selected reverberant environment to the speaker recognition score.

The voice feature extraction unit may extract the feature vector through signal contraction by extracting a characteristic signal from the voice signal and by excluding an unnecessary signal.

The speaker recognition unit may include a reverberant environment probability estimation unit configured to estimate a reverberant environment having a high probability of being similar to the feature vector in the multiple reverberant environment learning data sets; a speaker recognition model selection unit configured to select a model for recognizing a speaker from the reverberant environment estimated by the reverberant environment probability estimation unit; a speaker recognition score calculation unit configured to calculate the speaker recognition score using a reverberant environment model selected by the speaker recognition model selection unit; and a speaker recognition score weight combination unit configured to calculate a final speaker recognition score through a weighted combination of the speaker recognition score, calculated by the speaker recognition score calculation unit, and a reverberant environment probability, estimated by the reverberant environment probability estimation unit, and to recognize the speaker using the final speaker recognition score.

The reverberant environment probability estimation unit may include a voice learning database (DB) configured to store learning data including reverberant effects; a learning data classification unit configured to classify the learning data, stored in the voice learning DB, into the multiple reverberant environment learning data sets depending on the range of an reverberation time (RT60) value; and a deep-neural-network learning unit configured to estimate a probability that the feature vector is to be included in the reverberant environments of the multiple reverberant environment learning data sets classified by the learning data classification unit.

The learning data may include reverberant environments, the RT60 value of which ranges from 0.1 seconds to 0.9 seconds.

The deep-neural-network learning unit may take the cross-entropy between the estimated probability that the feature vector is to be included in the reverberant environments and a correct label that represents a reverberant environment corresponding to a correct answer as an objective function, as shown in the following Equation 1, and may run the objective function so as to be minimized, $$\text{Loss} = \frac{1}{U}\sum_{u=1}^{U}\frac{1}{T_u}\sum_{t=1}^{T_U} c_{t,u}\cdot \ln o_{t,u} \qquad \text{[Equation 1]}$$

where $o_{t,u}$ denotes a probability that is estimated using a deep neural network for the t-th voice frame of a u-th speech, $c_{t,u}$ denotes a correct reverberant environment label of the t-th voice frame of the u-th speech, and $T_u$ denotes the total number of voice frames of the u-th speech.

When the speaker recognition model selection unit selects the model, the model for recognizing the speaker may include a background speaker model, an Identity vector (i-vector) extraction model, and a Probabilistic Linear Discriminant Analysis (PLDA) model.

The speaker recognition score calculation unit may extract two i-vectors for the data of two speakers to be compared using the background speaker model and the i-vector extraction model and calculate the score using the extracted two i-vectors and the PLDA model.

The speaker recognition score weight combination unit may calculate the final speaker recognition score, s, using the following Equation 2, $$s = \left(\frac{p_1}{p_1+p_2}\right)s_1 + \left(\frac{p_2}{p_1+p_2}\right)s_2 \qquad \text{[Equation 2]}$$

where $p_1$ and $p_2$ denote two highest reverberant environment probabilities calculated by the reverberant environment probability estimation unit, and $s_1$ and $s_2$ denote speaker recognition scores calculated using a speaker recognition model learned in two reverberant environments.

In another embodiment, a method for recognizing a voice speaker may include: receiving, by a voice feature extraction unit, a voice signal through a microphone; extracting, by the voice feature extraction unit, a feature vector by extracting a characteristic signal from the voice signal; estimating, by a speaker recognition unit, a reverberant environment having a high probability of being similar to the feature vector in multiple reverberant environment learning data sets; selecting, by the speaker recognition unit, a model for recognizing a speaker from the estimated reverberant environment; calculating, by the speaker recognition unit, a speaker recognition score using a selected reverberant environment model; and calculating, by the speaker recognition unit, a final speaker recognition score through a weighted combination of the calculated speaker recognition score and an estimated reverberant environment probability.

The estimating of the reverberant environment having the high probability of being similar to the feature vector may be configured such that the speaker recognition unit classifies learning data stored in a voice learning DB into the multiple reverberant environment learning data sets depending on the range of an RT60 value and estimates a probability that the feature vector is to be included in the reverberant environments of the multiple reverberant environment learning data sets through deep neural network learning.

The learning data may include reverberant environments, the RT60 value of which ranges from 0.1 seconds to 0.9 seconds.

The estimating of the reverberant environment having the high probability of being similar to the feature vector may be configured such that the speaker recognition unit takes the cross-entropy between a probability that the feature vector is to be included in the reverberant environment and a correct label that represents a reverberant environment corresponding to a correct answer as an objective function, as shown in the following Equation 3, and runs the objective function so as to be minimized, $$\text{Loss} = \frac{1}{U}\sum_{u=1}^{U}\frac{1}{T_u}\sum_{t=1}^{T_U} c_{t,u}\cdot \ln o_{t,u} \qquad \text{[Equation 3]}$$

where $o_{t,u}$ denotes a probability that is estimated using a deep neural network for the t-th voice frame of a u-th speech, $c_{t,u}$ denotes a correct reverberant environment label of the t-th voice frame of the u-th speech, and $T_u$ denotes the total number of voice frames of the u-th speech.

The model for recognizing the speaker may include a background speaker model, an Identity vector (i-vector) extraction model, and a Probabilistic Linear Discriminant Analysis (PLDA) model.

The calculating of the speaker recognition score may be configured such that the speaker recognition unit extracts two i-vectors for the data of two speakers to be compared using the background speaker model and the i-vector extraction model and calculates the score using the extracted two i-vectors and the PLDA model.

The calculating of the final speaker recognition score may be configured such that the speaker recognition unit calculates the final speaker recognition score, s, through the following Equation 4, $$s = \left(\frac{p_1}{p_1+p_2}\right)s_1 + \left(\frac{p_2}{p_1+p_2}\right)s_2 \qquad \text{[Equation 4]}$$

where $p_1$ and $p_2$ denote two highest reverberant environment probabilities calculated by the speaker recognition unit, and $s_1$ and $s_2$ denote speaker recognition scores calculated using a speaker recognition model learned in two reverberant environments.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
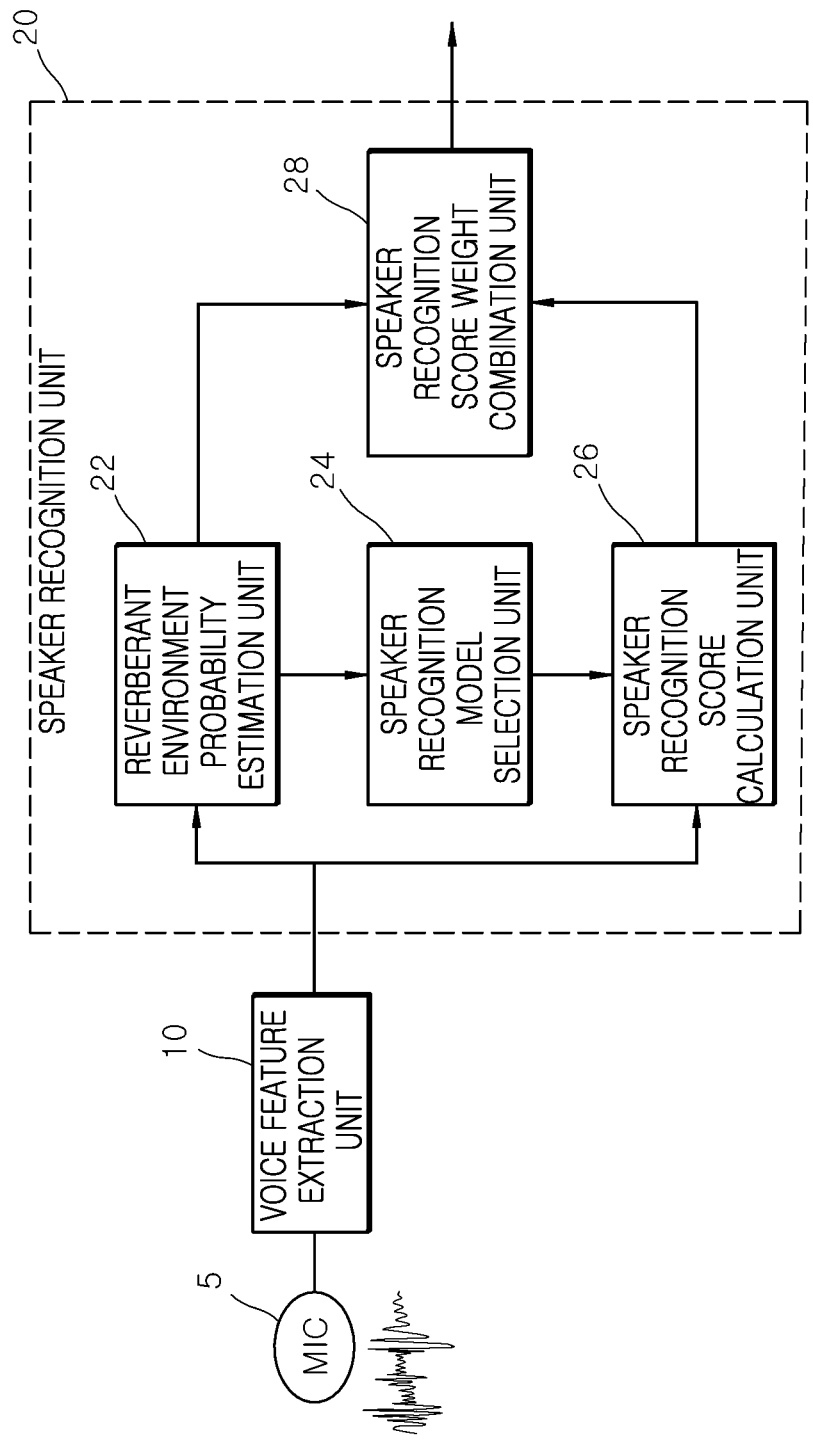
FIG. 1 is a block diagram illustrating an apparatus for recognizing a voice speaker in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 2:
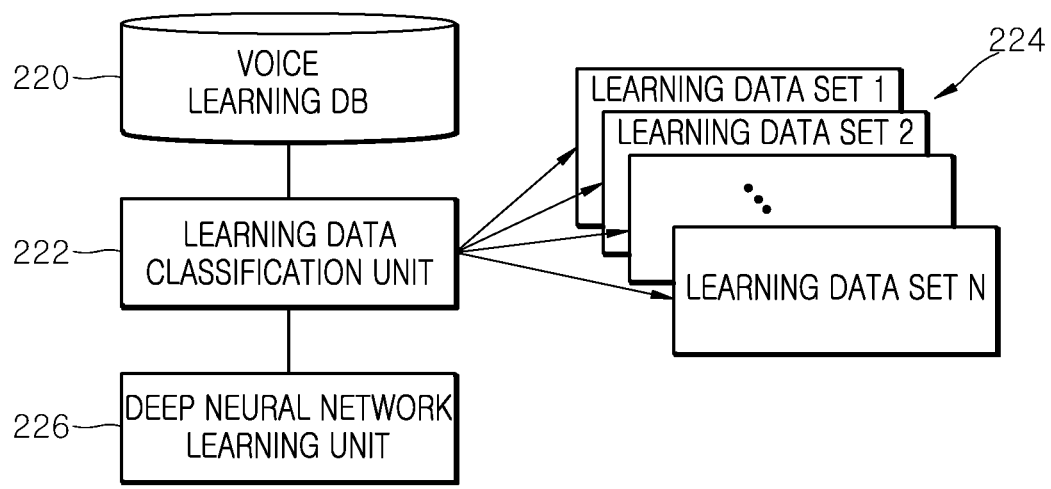
FIG. 2 is a block diagram illustrating a reverberant environment probability s estimation unit in an apparatus for recognizing a voice speaker in accordance with an embodiment of the present invention.

FIG. 1 is a block diagram illustrating an apparatus for recognizing a voice speaker according to an embodiment of the present invention, and FIG. 2 is a block diagram illustrating a reverberant environment probability estimation unit in an apparatus for recognizing a voice speaker according to an embodiment of the present invention.

As shown in FIG. 1, the apparatus for recognizing a voice speaker may include a voice feature extraction unit and a speaker recognition unit.

The voice feature extraction unit 10 extracts a feature vector from a voice signal inputted through a microphone 5.

Here, the voice feature extraction unit 10 extracts a feature vector through signal contraction by extracting a characteristic signal from the voice signal and by excluding an unnecessary signal, thereby transforming the inputted voice signal into another form of signal.

The speaker recognition unit 20 is configured to calculate a speaker recognition score by selecting a reverberant environment from multiple reverberant environment learning data sets based on the feature vector extracted by the voice feature extraction unit 10 and to recognize a speaker based on a final speaker recognition score that is calculated by assigning a weight based on the selected reverberant environment to the speaker recognition score.

Here, the speaker recognition unit 20 may include a reverberant environment probability estimation unit 22, a speaker recognition model selection unit 24, a speaker recognition score calculation unit 26, and a speaker recognition score weight combination unit 28.

The reverberant environment probability estimation unit 22 may estimate two types of reverberant environments having the highest probability of being similar to the feature vector, which is inputted from the voice feature extraction unit 10, from the multiple reverberant environment learning data sets.

Here, the reverberant environment probability estimation unit 22 may include a voice learning database (DB) 220, a learning data classification unit 222, and a deep-neural-network learning unit 226, as shown in FIG. 2.

The voice learning DB 220 stores learning data including reverberant environments, the RT60 value of which ranges from 0.1 seconds to 0.9 seconds, thereby providing the same to be used for learning of reverberant environment classification models and speaker recognition models.

The learning data classification unit 222 classifies the learning data stored in the voice learning DB 220 into multiple learning data sets 224 based on the range of RT60 values such that each learning data set has learning data having a similar range of RT60 values.

The deep-neural-network learning unit 226 estimates a probability that the feature vector is to be included in the reverberant environments of the multiple learning data sets classified by the learning data classification unit 222 in order to estimate the reverberant environment of the speech, from which the feature vector is extracted, in the distorted feature vector including reverberation.

Here, the deep-neural-network learning unit 226 may take the cross-entropy between the estimated probability that the feature vector is to be included in the reverberant environment and a correct label that represents a reverberant environment corresponding to a correct answer as an objective function, as shown in Equation (1), and may run the objective function so as to be minimized.

$$\text{Loss} = \frac{1}{U} \sum_{u=1}^{U} \frac{1}{T_u} \sum_{t=1}^{T_U} c_{t,u} \cdot \ln o_{t,u} \qquad (1)$$

where $o_{t,u}$ denotes a probability that is estimated using a deep neural network for the t-th voice frame of the u-th speech, $c_{t,u}$ denotes the correct reverberant environment label of the t-th voice frame of the u-th speech, and $T_u$ denotes the total number of voice frames of the u-th speech.

Here, $o_{t,u}$ is an N-dimensional vector, and the respective dimensions thereof may be probabilities estimated for the N types of reverberant environments that configure the learning data set 224. The result of estimation of the reverberant environment for the t-th voice frame of the u-th speech may be determined through Equation (2):

$$RT60_{class} = \text{argmax} o_{t,u} \qquad \text{Equation (2)}$$

Also, for a reverberant environment for the entire u-th speech, the averages of the estimation results $RT60_{class}$ for the respective reverberant environments, which are determined for a total of $T_u$ voice frames, are arranged from the largest to the smallest, and two types of reverberant environments corresponding to the two highest average probabilities $p_1$ and $p_2$ may be estimated.

The speaker recognition model selection unit 24 selects a model configured for recognizing a speaker for the two types of reverberant environments estimated by the reverberant environment probability estimation unit 22.

The speaker recognition model selection unit 24 may select a background speaker model, an Identity vector (i-vector) extraction model, and a Probabilistic Linear Discriminant Analysis (PLDA) model, which are learned using learning data sets 224 corresponding to the respective reverberant environments.

The speaker recognition score calculation unit 26 may calculate a speaker recognition score using the reverberant environment model selected by the speaker recognition model selection unit 24.

Here, using the background speaker model and the i-vector extraction model, the speaker recognition score calculation unit 26 may extract two i-vectors for the data of two speakers to be compared, and may calculate the score using the extracted two i-vectors and the PLDA model.

The speaker recognition score weight combination unit 28 may calculate a final speaker recognition score through a weighted combination of the speaker recognition score, which is calculated by the speaker recognition score calculation unit 26, and the reverberant environment probability, which is estimated by the reverberant environment probability estimation unit 22, and may recognize a speaker using the final speaker recognition score.

Here, the speaker recognition score weight combination unit 28 may calculate the final speaker recognition score, s, using Equation (3):

$$s = \left(\frac{p_1}{p_1 + p_2}\right)s_1 + \left(\frac{p_2}{p_1 + p_2}\right)s_2 \quad (3)$$

where $p_1$ and $p_2$ denote the two highest reverberant environment probabilities calculated by the reverberant environment probability estimation unit 22, and $s_1$ and $s_2$ denote speaker recognition scores calculated using speaker recognition models that are learned in the two reverberant environments.

Accordingly, a speaker may be recognized by comparing the final speaker recognition score, calculated by the speaker recognition score weight combination unit 28, with a fixed threshold value, and whether the i-vectors extracted from the two speeches are come from the same speaker may be determined.

As described above, the apparatus for recognizing a voice speaker according to an embodiment of the present invention calculates a speaker recognition score by extracting a model that is closest to a specific reverberant environment from among multiple reverberant environments used to configure learning data sets and recognizes a speaker by assigning weights based on the respective environments thereto, whereby speaker recognition performance may be improved in a wide variety of reverberant environments.

Figure 3:
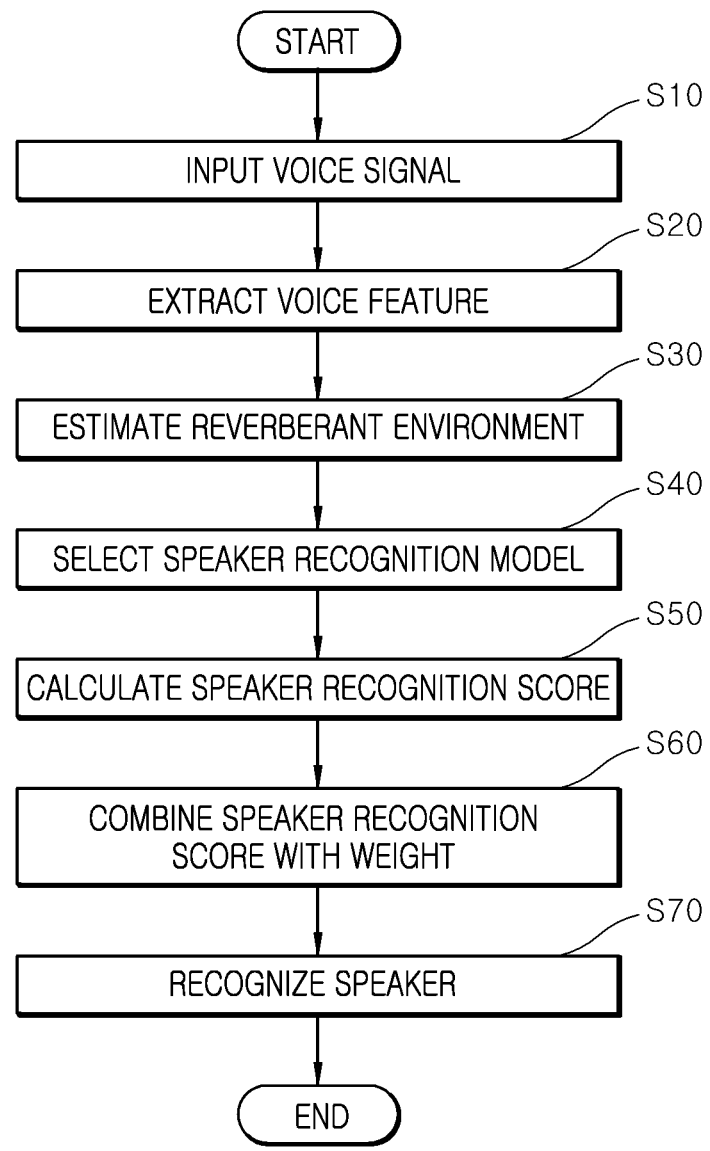
FIG. 3 is a flowchart for explaining a method for recognizing a voice speaker in accordance with an embodiment of the present invention.

FIG. 3 is a flowchart for explaining a method for recognizing a voice speaker according to an embodiment of the present invention.

As shown in FIG. 3, in the method for recognizing a voice speaker according to an embodiment of the present invention, first, a voice feature extraction unit 10 receives a voice signal through a microphone 5 at step S10.

When it receives the voice signal at step S10, the voice feature extraction unit 10 extracts a feature vector through signal contraction by extracting a characteristic signal from the voice signal and by excluding an unnecessary signal, thereby transforming the received voice signal into another form of signal at step S20.

A speaker recognition unit 20, which received the feature vector extracted at step S20, estimates a reverberant environment having a high probability of being similar to the feature vector in multiple reverberant environment learning data sets 224 at step S30.

At step S30, the speaker recognition unit 20 may classify learning data stored in a voice learning DB 220 into the multiple learning data sets 224 depending on the range of RT60 values and estimate a probability that the feature vector is to be included in the reverberant environments of the classified learning data sets 224 through deep neural network learning.

Here, the learning data may include reverberant environments, the RT60 value of which ranges from 0.1 seconds to 0.9 seconds.

When it estimates a reverberant environment that is highly likely to be similar to the feature vector at step S30, the speaker recognition unit 20 may take the cross-entropy between the estimated probability that the feature vector is to be included in the reverberant environment and a correct label that represents a reverberant environment corresponding to a correct answer as an objective function, as shown in Equation (4), and may run the objective function so as to be minimized.

$$\text{Loss} = \frac{1}{U}\sum_{u=1}^{U} \frac{1}{T_u}\sum_{t=1}^{T_U} c_{t,u} \cdot \ln o_{t,u} \quad (4)$$

where $o_{t,u}$ denotes a probability that is estimated using a deep neural network for the t-th voice frame of the u-th speech, $c_{t,u}$ denotes the correct reverberant environment label of the t-th voice frame of the u-th speech, and $T_u$ denotes the total number of voice frames of the u-th speech.

Here, $o_{t,u}$ is an N-dimensional vector, and the respective dimensions thereof refer to estimated probabilities for the N types of reverberant environments that configure the learning data set 224. The result of estimation of the reverberant environment for the t-th voice frame of the u-th speech may be determined through Equation (5):

$$RT60_{class} = \text{argmax} \, o_{t,u}$$

Also, for a reverberant environment for the entire u-th speech, the averages of the estimation results $RT60_{class}$ for the respective reverberant environments, which are determined for a total of $T_u$ voice frames, are arranged from the largest to the smallest, and two types of reverberant environments corresponding to the two highest average probabilities $p_1$ and $p_2$ may be estimated.

After it estimates the reverberant environment at step S30, the speaker recognition unit 20 may select a model for recognizing a speaker from the estimated reverberant environment at step S40.

Here, as models that are configured for recognizing a speaker in the estimated two types of reverberant environments, the speaker recognition unit 20 may select a background speaker model, an Identity vector (i-vector) extraction model, and a Probabilistic Linear Discriminant Analysis (PLDA) model, which are learned using the learning data sets 224 corresponding to the respective reverberant environments.

After it selects the speaker recognition model at step S40, the speaker recognition unit 20 calculates a speaker recognition score using the selected reverberant environment model at step S50.

Here, the speaker recognition unit 20 may extract two i-vectors for the data of two speakers to be compared using the background speaker model and the i-vector extraction model, and may calculate the score using the extracted two i-vectors and the PLDA model.

After it calculates the speaker recognition score at step S50, the speaker recognition unit 20 calculates a final speaker recognition score at step S60 through a weighted combination of the calculated speaker recognition score and the estimated reverberant environment probability.

At step S60, the speaker recognition unit 20 may calculate the final speaker recognition score, s, through Equation (6):

$$s = \left(\frac{p_1}{p_1+p_2}\right)s_1 + \left(\frac{p_2}{p_1+p_2}\right)s_2 \qquad (6)$$

where $p_1$ and $p_2$ denote the two highest reverberant environment probabilities calculated by the speaker recognition unit, and $s_1$ and $s_2$ denote speaker recognition scores calculated using the speaker recognition model learned in the two reverberant environments.

After it calculates the final speaker recognition score at step S60, the speaker recognition unit 20 may recognize a speaker by comparing the calculated final speaker recognition score with a fixed threshold value, and may determine at step S70 whether the i-vectors extracted from two speeches are come from the same speaker.

As described above, according to the method for recognizing a voice speaker according to an embodiment of the present invention, a speaker recognition score is calculated by extracting a model that is closest to a specific reverberant environment from among multiple reverberant environments used to configure learning data sets, and a speaker is recognized by assigning weights based on the respective environments thereto, whereby speaker recognition performance may be improved in a wide variety of reverberant environments.

The apparatus and method for recognizing a voice speaker in accordance with one aspect of the present embodiment may improve speaker recognition performance in a wide variety of reverberant environments by recognizing a speaker in such a way that a speaker recognition score is calculated by extracting a model that is closest to a specific reverberant environment from a plurality of reverberant environments used to configure learning data sets and that a weight based on each environment is assigned to the speaker recognition score.

Although preferred embodiments of the invention have been disclosed for illustrative purposes, those skilled in the art will appreciate that various modifications, additions and substitutions are possible, without departing from the scope and spirit of the invention as defined in the accompanying claims.

Accordingly, the scope of the present invention shall be determined only according to the attached claims.

What is claimed is:

1. An apparatus for recognizing a voice speaker, comprising:
a voice feature extraction unit configured to extract a feature vector from a voice signal inputted through a microphone; and
a speaker recognition unit configured to calculate a speaker recognition score by selecting a reverberant environment from multiple reverberant environment learning data sets based on the feature vector extracted by the voice feature extraction unit and to recognize a speaker by assigning a weight depending on the selected reverberant environment to the speaker recognition score, wherein the speaker recognition unit comprises:
a reverberant environment probability estimation unit configured to estimate a reverberant environment having a high probability among a plurality of reverberant environment probabilities of being similar to the feature vector in the multiple reverberant environment learning data sets;
a speaker recognition model selection unit configured to select a model for recognizing a speaker from the reverberant environment estimated by the reverberant environment probability estimation unit;
a speaker recognition score calculation unit configured to calculate the speaker recognition score using a reverberant environment model selected by the speaker recognition model selection unit; and
a speaker recognition score weight combination unit configured to calculate a final speaker recognition score through a weighted combination of the speaker recognition score, and a reverberant environment probability, and to recognize the speaker using the final speaker recognition score,
wherein the speaker recognition score weight combination unit calculates the final speaker recognition scores, using the equation, $$s = \left(\frac{p_1}{p_1+p_2}\right)s_1 + \left(\frac{p_2}{p_1+p_2}\right)s_2$$

wherein $p_1$ and $p_2$ denote two highest reverberant environment probabilities calculated by the reverberant environment probability estimation unit, and $s_1$ and $s_2$ denote speaker recognition scores calculated using a speaker recognition model learned in two reverberant environments.

2. The apparatus of claim 1, wherein the voice feature extraction unit configured to extract the feature vector through signal contraction by extracting a characteristic signal from the voice signal and by excluding an unnecessary signal.

3. The apparatus of claim 1, wherein the reverberant environment probability estimation unit comprises:
a voice learning database (DB) configured to store a learning data including reverberant effects;
a learning data classification unit configured to classify the learning data, stored in the voice learning DB, into the multiple reverberant environment learning data sets depending on a range of a reverberation time (RT60) value; and
a deep-neural-network learning unit configured to estimate a probability that the feature vector is to be included in reverberant environments of the multiple reverberant environment learning data sets classified by the learning data classification unit.

4. The apparatus of claim 3, wherein the learning data includes reverberant environments, an RT60 value of which ranges from about 0.1 seconds to about 0.9 seconds.

5. The apparatus of claim 3, wherein the deep-neural-network learning unit takes a cross-entropy between the estimated probability that the feature vector is to be included in the reverberant environments and a correct label that represents a reverberant environment corresponding to a correct answer as an objective function, as shown in a following Equation 1, and runs the objective function so as to be minimized, $$\text{Loss} = \frac{1}{U}\sum_{u=1}^{U} \frac{1}{T_u}\sum_{t=1}^{T_u} c_{t,u} \cdot \ln o_{t,u} \qquad \text{[Equation 1]}$$

wherein $o_{t,u}$ denotes a probability that is estimated using a deep neural network for a t-th voice frame of a u-th speech, $c_{t,u}$ denotes a correct reverberant environment label of the t-th voice frame of the u-th speech, and $T_u$ denotes a total number of voice frames of the u-th speech.

6. The apparatus of claim 1, wherein, when the speaker recognition model selection unit selects the model, the model for recognizing the speaker includes a background speaker model, an Identity vector (i-vector) extraction model, and a Probabilistic Linear Discriminant Analysis (PLDA) model.

7. The apparatus of claim 6, wherein the speaker recognition score calculation unit extracts two i-vectors for data of two speakers to be compared using the background speaker model and the i-vector extraction model and calculates the speaker recognition score using the extracted two i-vectors and the PLDA model.

8. A method for recognizing a voice speaker, comprising:
receiving, by a voice feature extraction unit, a voice signal through a microphone;
extracting, by the voice feature extraction unit, a feature vector by extracting a characteristic signal from the voice signal;
estimating, by a speaker recognition unit, a reverberant environment having a high probability of being similar to the feature vector in multiple reverberant environment learning data sets;
selecting, by the speaker recognition unit, a model for recognizing a speaker from the estimated reverberant environment;
calculating, by the speaker recognition unit, a speaker recognition score using a selected reverberant environment model; and
calculating, by the speaker recognition unit, a final speaker recognition score through a weighted combination of the calculated speaker recognition score and an estimated reverberant environment probability,
wherein the estimating of the reverberant environment having the high probability of being similar to the feature vector is configured such that the speaker recognition unit takes a cross-entropy between a probability that the feature vector is to be included in the reverberant environment and a correct label that represents a reverberant environment corresponding to a correct answer as an objective function, as shown in a following, and runs the objective function so as to be minimized, $$\text{Loss} = \frac{1}{U}\sum_{u=1}^{U} \frac{1}{T_u}\sum_{t=1}^{T_u} c_{t,u} \cdot \ln o_{t,u} \qquad \text{[Equation 3]}$$

wherein $o_{t,u}$ denotes a probability that is estimated using a deep neural network for a t-th voice frame of a u-th speech, $c_{t,u}$ denotes a correct reverberant environment label of the t-th voice frame of the u-th speech, and $T_u$ denotes a total number of voice frames of the u-th speech.

9. The method of claim 8, wherein the estimating of the reverberant environment having the high probability of being similar to the feature vector is configured such that the speaker recognition unit classifies learning data stored in a voice learning DB into the multiple reverberant environment learning data sets depending on a range of an RT60 value and estimates a probability that the feature vector is to be included in reverberant environments of the classified multiple reverberant environment learning data sets through deep neural network learning.

10. The method of claim 9, wherein the learning data includes reverberant environments, an RT60 value of which ranges from about 0.1 seconds to about 0.9 seconds.

11. The method of claim 8, wherein the model for recognizing the speaker includes a background speaker model, an Identity vector (i-vector) extraction model, and a Probabilistic Linear Discriminant Analysis (PLDA) model.

12. The method of claim 11, wherein the calculating of the speaker recognition score is configured such that the speaker recognition unit extracts two i-vectors for data of two speakers to be compared using the background speaker model and the i-vector extraction model and calculates the score using the extracted two i-vectors and the PLDA model.

13. A method for recognizing a voice speaker, comprising:
receiving, by a voice feature extraction unit, a voice signal through a microphone;
extracting, by the voice feature extraction unit, a feature vector by extracting a characteristic signal from the voice signal;
estimating, by a speaker recognition unit, a reverberant environment having a high probability of being similar to the feature vector in multiple reverberant environment learning data sets;
selecting, by the speaker recognition unit, a model for recognizing a speaker from the estimated reverberant environment;
calculating, by the speaker recognition unit, a speaker recognition score using a selected reverberant environment model; and
calculating, by the speaker recognition unit, a final speaker recognition score through a weighted combination of the calculated speaker recognition score and an estimated reverberant environment probability,
wherein the calculating of the final speaker recognition score is configured such that the speaker recognition unit calculates the final speaker recognition scores, through an equation, $$s = \left(\frac{p_1}{p_1+p_2}\right)s_1 + \left(\frac{p_2}{p_1+p_2}\right)s_2$$

wherein $p_1$ and $p_2$ denote two highest reverberant environment probabilities calculated by the speaker recognition unit, and $s_1$ and $s_2$ denote speaker recognition scores calculated using a speaker recognition model learned in two reverberant environments.

* * * * *